United States Patent
Hveding et al.

(10) Patent No.: US 11,777,335 B2
(45) Date of Patent: Oct. 3, 2023

(54) SYSTEMS AND METHODS TO HARVEST ENERGY AND DETERMINE WATER HOLDUP USING THE MAGNETOHYDRODYNAMIC PRINCIPLE

(71) Applicant: Saudi Arabian Oil Company, Dhahran (SA)

(72) Inventors: Frode Hveding, Dhahran (SA); Muhammad Arsalan, Khobar (SA)

(73) Assignee: Saudi Arabian Oil Company, Dbabran (SA)

( * ) Notice: Subject to any disclaimer, the term of this patent is extended or adjusted under 35 U.S.C. 154(b) by 178 days.

(21) Appl. No.: 17/148,804

(22) Filed: Jan. 14, 2021

(65) Prior Publication Data

US 2021/0135559 A1 May 6, 2021

Related U.S. Application Data

(63) Continuation of application No. 15/634,014, filed on Jun. 27, 2017, now Pat. No. 10,923,998.

(51) Int. Cl.
*H02K 44/08* (2006.01)
*H02K 44/12* (2006.01)
(Continued)

(52) U.S. Cl.
CPC .............. *H02J 7/32* (2013.01); *E21B 34/066* (2013.01); *H02J 50/00* (2016.02); *H02J 50/001* (2020.01);
(Continued)

(58) Field of Classification Search
CPC ........ H02K 44/12; H02K 44/10; H02K 44/08; H02K 44/085; H02J 7/32
See application file for complete search history.

(56) References Cited

U.S. PATENT DOCUMENTS

| 4,151,423 A | 4/1979 | Hendel |
| 4,824,329 A | 4/1989 | Yamamoto et al. |

(Continued)

FOREIGN PATENT DOCUMENTS

| CN | 108134503 B | * | 9/2019 | .......... H02K 44/085 |
| DE | 10260561 A1 | * | 7/2004 | ............. G01F 1/584 |

(Continued)

OTHER PUBLICATIONS

Machine translation of Liu, CN-108134503-B, Sep. 10, 2019 (Year: 2019).*

(Continued)

*Primary Examiner* — Bernard Rojas
(74) *Attorney, Agent, or Firm* — Bracewell LLP; Constance G. Rhebergen; Keith R. Derrington

(57) ABSTRACT

Embodiments provide systems and methods for creating and storing energy using the magnetohydrodynamic principle and the flow of a conductive fluid through a magnetic field downhole in a pipeline system. The system can also be configured to determine water holdup using the magnetohydrodynamic principle. The energy the system generates can be used to control electric valves and other electronic devices along the pipeline. The power storing and generating system can be configured to include permanent magnets, electrode pairs, isolation material, and a conductive flowing multiphase media. The multiphase media, i.e., oil, gas, water, or a mixture, flows through a pipeline that has electrodes in direct contact with the media and magnets also configured adjacent the media. The electrode pairs can be arranged inside of the pipeline opposite each other, with a permanent magnet placed between the electrodes and flush to the inside of the pipe, with flux lines perpendicular to the flow direction. Power output from the system is a function of the conductive fluid volume, flow velocity, magnet (Continued)

strength, and electrode size. Various embodiments include different arrangements of permanent magnets and electrode pairs.

5 Claims, 3 Drawing Sheets

(51) Int. Cl.
  *H02J 7/32* (2006.01)
  *E21B 34/06* (2006.01)
  *H02K 44/10* (2006.01)
  *H02J 50/00* (2016.01)

(52) U.S. Cl.
  CPC ........... *H02K 44/08* (2013.01); *H02K 44/085* (2013.01); *H02K 44/10* (2013.01); *H02K 44/12* (2013.01)

(56) References Cited

U.S. PATENT DOCUMENTS

| | | |
|---|---|---|
| 7,061,129 B2 | 6/2006 | Perlo et al. |
| 7,166,927 B2 | 1/2007 | Koslover et al. |
| 7,400,262 B2 | 7/2008 | Chemali et al. |
| 7,919,878 B2 | 4/2011 | Peralta |
| 7,973,434 B2 | 7/2011 | Yazawa et al. |
| 8,294,287 B2 | 10/2012 | Oleynik et al. |
| 8,916,983 B2 | 12/2014 | Marya et al. |
| 2009/0101341 A1 | 4/2009 | Willauer |
| 2011/0057449 A1 | 3/2011 | Marya et al. |
| 2011/0241448 A1 | 10/2011 | Kay et al. |
| 2014/0210307 A1 | 7/2014 | Tosi et al. |
| 2015/0005699 A1 | 1/2015 | Burbank et al. |
| 2016/0160845 A1 | 6/2016 | Weaver et al. |
| 2017/0120253 A1 | 5/2017 | Sanford et al. |

FOREIGN PATENT DOCUMENTS

| | | |
|---|---|---|
| WO | 2015080700 A1 | 6/2015 |
| WO | 2018052863 A1 | 3/2018 |

OTHER PUBLICATIONS

The International Search Report and Written Opinion for related PCT application PCT/US2018/037821 dated Sep. 28, 2018. (SA5498).

* cited by examiner

SYSTEMS AND METHODS TO HARVEST ENERGY AND DETERMINE WATER HOLDUP USING THE MAGNETOHYDRODYNAMIC PRINCIPLE

PRIORITY

This application is a continuation of and claims priority to U.S. patent application Ser. No. 15/634,014, filed Jun. 27, 2017 titled SYSTEMS AND METHODS TO HARVEST ENERGY AND DETERMINE WATER HOLDUP USING THE MAGNETOHYDRODYNAMIC PRINCIPLE and the entire disclosure of which is incorporated here by reference.

BACKGROUND

Embodiments of the present disclosure relate to systems and methods for generating electrical power using the magnetohydrodynamic ("MHD") principle. More particularly, embodiments relate to utilizing multiphase flow to determine water holdup and to create and store energy to power downhole equipment in a pipeline system.

Description of Related Art

The oil and gas industry has a fairly large need for electrical power in all areas of its business, including wells, pipelines, and refineries. Various equipment used in the oil and gas industry, such as valves and sensors require power to function. This power can be supplied by a power grid or other means. However, it is also desirable to power these devices through the use of power generated on site. Further, for efficiency reasons, powering these devices through wires is not desirable given the fact that remote power locations can be costly to operate. Given the length of pipeline systems, wires are likely to be damaged. These replacement costs are high and therefore another source of power that is sustainable is necessary.

In view of the above problems, the following new methods and systems seek to generate and provide power to equipment in a pipeline system on site. Providing power at the wellsite underground and in hard to reach areas helps to reduce the cost of replacing downed wires and remote power systems. Water holdup determinations based on the energy generated over a particular period of time for a particular reservoir is also achievable by some of the described embodiments.

SUMMARY

Embodiments of the present application are directed to a system and method for generating and storing power using the MHD principle in a pipeline system. The MHD principle deals with current flow induced in an electrically conductive material when it is placed in a magnetic field. The MHD system, according to various embodiments, is attached to a portion of a pipeline where it harvests energy generated from a flowing media through the pipe portion and uses the energy to power other equipment on the pipeline. For instance, the generated and stored power is used to provide electric power to valves and other electronic equipment that may be configured downhole. When a conductive fluid flows through a permanent magnetic field, it generates kinetic energy that can be converted into electricity by separating charged particles. This generates an electric field traverse to the direction of fluid flow and magnetic field. The electric field generated can be used to power low-energy demanding valves and gauges downhole in a producer or injector or other electronic equipment that may be configured downhole.

The system uses permanent magnets, so that the magnetic field is constant and therefore the variation in power generated is a function of the volume of conductive fluid and flow velocity. The naturally-occurring saline water with high conductivity within the gas, oil, and water flow of the pipeline system is the source of the power generation in the invention. The device can also be configured to measure water holdup based on the amount of power generated in either a downhole application or for surface pipes. Leads are attached to each electrode to bring the power to the valves and other electronic equipment downhole. In an embodiment, the valves or other electronic equipment downhole can be configured with a smart power system with capacitance to store the energy being generated by the system. In another embodiment, batteries may also be configured to store the energy being generated. Such a valve or downhole electronics setup can further be configured, in an embodiment, to receive wireless control and configuration signals and messages from a control room or control system that direct the operation of the valve or other electronic equipment. The valve and other electronic equipment may also be configured to receive control and configuration communications via wireless or via wired communication channels.

Embodiments of systems and methods of the present disclosure are designed, for example, to safely, accurately, and reliably generate and store energy that can be provided to various devices attached to the pipeline, such as electrically-actuated or electronically-controlled valves downhole in a producer or injector.

Embodiments of systems and methods of the present disclosure generate and store power by having a conductive fluid flow through a permanent magnetic field. The system converts the kinetic energy of the conductive fluid into electricity by separating the charged particles using magnets and electrodes, which generate an electric field transverse to the direction of fluid flow and magnetic field.

Embodiments of systems and methods of the present disclosure calculate the power generated based on the amount and speed of the conductive fluid flow through the system. When the magnetic field is kept constant, the velocity and volume of conductive fluid (i.e., formation water) will impact the amount of power generated. This effect can be used to determine the conductive fluid holdup, which relates to the velocity of the fluid and the conductive fluid cut. Flow patterns for various Reynolds numbers can be captured by the design of the system.

Embodiments of systems and methods of the present disclosure include a power harvesting MHD system consisting of permanent magnets, electrodes, isolation material, and a conductive flowing material, among other pieces of equipment. The system can be configured to include a combination of the previously listed components and various magnets and electrodes of various types, length, size, locations, and orientations for both surface pipelines, downhole systems, and for injectors and producers.

According to an embodiment, there is provided a MHD power generation system configured in a pipeline with one or more permanent magnets, one or more flow tubes arranged inside the pipeline, a set of electrode pairs lining the one or more flow tubes and in contact with a flowing media through the pipeline to generate and store power in concert with the one or more permanent magnets, a plurality of downhole valves powered by the MHD power generation system, and a processor connected to the set of electrode pairs and the one or more permanent magnets, the processor executing a set of instructions on a non-transitory computer readable media to calculate a water holdup measurement based upon an amount of power generated by the MHD power generation system.

According to an embodiment, the MHD power generation system is configured to calculate the water holdup based on fluid flow velocity and conductive fluid cut of the flowing media.

According to an embodiment, the plurality of downhole valves are choked in order to decrease the fluid flow of a non-conductive fluid component of the flowing media such that the fluid flow of conductive fluid component of the flowing media in adjacent passages is optimized and more power is generated.

According to an embodiment, a contact area between the flowing media, the set of electrode pairs, and the positioning of the one or more permanent magnets, are each optimized.

According to an embodiment, the one or more permanent magnets and set of electrode pairs are arranged in a flow tube design using density variations to optimize the chance of capturing the continuous phase of a conductive fluid component of the flowing media.

According to an embodiment, the MHD power generation system is designed with materials such that it can withstand high temperatures without degradation.

According to an embodiment, there is provided a method for generating and storing energy using the MHD principle, the method comprising the steps of: flowing media through a MHD power generation system configured in a pipeline; generating power using the MHD principle with a power generation system including one or more permanent magnets, a set of electrode pairs, and isolation material configured in concert with the media flow, wherein the media flows through a set of pipes containing the one or more permanent magnets, the set of electrode pairs, and the isolation material; storing the power so that it can be used downhole to power a set of electric valves simultaneously; controlling the flow of the media using one or more electric valves; and calculating the water holdup based on the amount of power stored and generated.

According to an embodiment, the power generation system calculates the water holdup based on the fluid flow velocity and conductive fluid cut of the flowing media.

According to an embodiment, the one or more electric valves of at least some flow passages are choked in order to decrease the fluid flow of a non-conductive fluid component of the flowing media such that the fluid flow of conductive fluid component of the flowing media in adjacent passages is optimized and more power is generated.

According to an embodiment, the one or more permanent magnets and the set of electrode pairs are arranged in a flow tube design using density variations to optimize the chance of capturing the continuous phase of a conductive fluid component of the flowing media.

According to an embodiment, a contact area between the flowing media, the set of electrode pairs, and the positioning of the one or more permanent magnets, are each optimized.

According to an embodiment, the MHD power generation system is designed with materials such that it can withstand high temperatures without degradation.

According to an embodiment, there is provided a MHD power generation system comprising: one or more permanent magnets, one or more flow tubes arranged inside the pipeline, a set of electrode pairs configured to be in contact with the outer surface of conductive flow tubes that are in contact with a flowing media through the pipeline to generate and store power in concert with the one or more permanent magnets, a plurality of downhole valves powered by the MHD power generation system, and a processor connected to the set of electrode pairs and the one or more permanent magnets, the processor executing a set of instructions on a non-transitory computer readable media to calculate a water holdup measurement based upon an amount of power generated by the MEM power generation system.

BRIEF DESCRIPTION OF DRAWINGS

The foregoing aspects, features, and advantages of embodiments of the present disclosure will further be appreciated when considered with reference to the following description of embodiments and accompanying drawings. In describing various embodiments illustrated in the appended drawings, specific terminology will be used for the sake of clarity. However, the disclosure is not intended to be limited to the specific terms used, and it is to be understood that each specific term includes equivalents that operate in a similar manner to accomplish a similar purpose.

DETAILED DESCRIPTION

Figure 1:
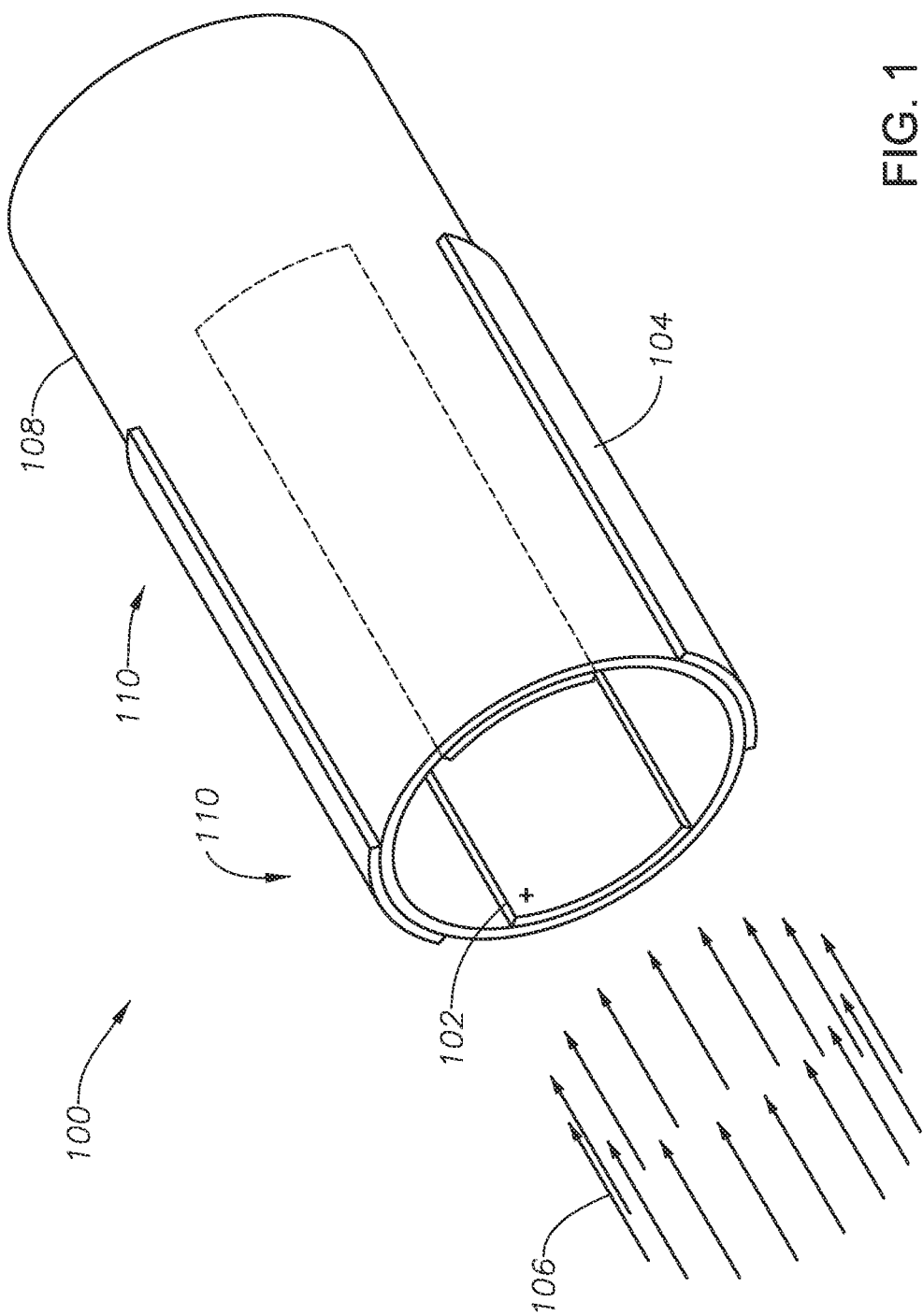
FIG. 1 illustrates a side perspective view of a general pipeline system configured in accordance with an embodiment.

Advantages and features of the systems and methods of accomplishing the same will be apparent by referring to embodiments described below in detail in connection with the accompanying drawings. However, the systems and methods are not limited to the embodiments disclosed below and may be implemented in various different forms. The embodiments are provided only for completing the disclosure and for fully representing the scope of the disclosed technology to those skilled in the art.

For simplicity and clarity of illustration, the drawing figures illustrate the general manner of construction, and descriptions and details of well-known features and techniques may be omitted to avoid unnecessarily obscuring the discussion of the described embodiments of the invention. Additionally, elements in the drawing figures are not necessarily drawn to scale. For example, the dimensions of some of the elements in the figures may be exaggerated relative to other elements to help improve understanding of the various embodiments. Like reference numerals refer to like elements throughout the specification.

Hereinafter, various embodiments will be described in detail with reference to the accompanying drawings.

Embodiments relate to a MHD power harvesting system with four main components: permanent magnets, electrodes, isolation material, and a conductive flowing media. Varying setups between the magnets and the electrodes can be designed, depending on type, length, size, orientation, and location of the pipeline system. As the multiphase media enters the pipeline and the MHD system, which is attached to a portion of the pipeline, the conductive liquid produces an output voltage when it passes through the magnetic field created by the magnets, which are oriented perpendicular to the flow of the media and electrodes which are orthogonal to the flow of the media and the magnets. For example, in an embodiment, the magnets can be configured on each side of a pipe, at 0 degrees and 180 degrees. In this embodiment, the electrodes can further be configured at 90 degrees and 270 degrees. In alternate embodiments, variations of this configuration can also be achieved such that at least some portions of the magnets are on opposing portions of a pipe and at least some portions of the electrodes are also on opposing portions of a given pipe. The current (I) generated by the conductive flowing media will be affected by the magnetic field strength, the flow velocity, the conductive fluid mass volume, the contact area of the electric conductor, the fluid density and the diameter of the pipeline. In general, for a particular configuration of the system, the stronger the magnetic field the more energy is produced, and the higher the fluid velocity the more energy is produced. Further, the more conductive the fluid in the system, the more energy may be produced. In an embodiment, longer electrode sections and/or stronger magnetic field sections can be configured to achieve the desired energy output for a particular system. The rate of fluid flow can also be taken into account when determining the configuration of a particular system. Additionally, the expected conductivity of the flowing media for a particular system can also help determine the configuration parameters, such as magnet strength, and electrode size and length. However, these are all static factors except for the flow velocity and conductivity.

In an embodiment, it may be desirable to split the overall flow into smaller pipes and/or tubulars to better accommodate for sudden pressure drops and/or pressure spikes. By spreading the flow out among many pipes, the overall effect of a pressure spike can be limited or at least reduced.

It is generally known that according to Faraday's law of electromagnetic induction, any change in the magnetic field with time induces an electric field perpendicular to the changing magnetic field given by the equation:

$$E = -\frac{d(BA)}{dt} = -\frac{d\Phi}{dt},$$

where E is the voltage or potential difference generated due to the induced current, B is the magnetic field strength, A is the cross section area, $\Phi$ is the magnetic flux. The negative sign in the equation above indicates that the induced current will create another magnetic field opposing to the buildup of the magnetic field in the coil based on Lenz's Law. When a voltage is generated by a change in magnetic flux according to Faraday's Law, the polarity of the induced voltage is such that it produces a current whose magnetic field opposes the change which produces it. The induced magnetic field inside any loop of wire always acts to keep the magnetic flux in the loop constant. If the flux is increasing, the induced field acts in opposition to it. If it is decreasing, the induced field acts in the direction of the applied field to oppose the change.

Since the magnetic field B is fixed for a permanent magnet, the equation becomes:

$$E = -B\frac{dl}{dt}D = -BvD,$$

where v is the flow velocity and D is the distance between two electrodes. The potential difference E can then be transferred to power valves and the like. In an embodiment, the electrodes are in direct contact with the conductive material as it flows through the pipe. In an alternative embodiment the electrodes can also be separated from the conductive material if the pipe section is made of a material that is conductive. To avoid corrosion of the electrodes, special considerations can be made in a given configuration to shield them from corrosive materials.

Generating and Storing Energy Using the Magnetohydrodynamic Principle

Using the magnetohydrodynamic ("MHD") principle to generate power is a well-known concept in the field of power generation. Embodiments of the present invention optimize the fluid contact with the electrodes for low water cut wells and higher water cut wells to generate the most energy possible. A computer system tracks the amount of power generated and makes a water holdup determination using this data.

There is an induced electromagnetic force from the flow of the media in the present invention. The induced electric field density is given by the equation E=vB, where v is the velocity of the media and B is the magnetic induction field generated by the magnets and electrodes $$I = \frac{U}{R1 + R2}$$

is the current generated between the electrodes shown in FIG. 1. There is a device connected to the electrodes with a resistance R2 and the resistance between electrodes R1 that is used to calculate the current flow. Further, U is the velocity of the liquid multiplied by the electric field strength generated by the magnets multiplied by the distance between the electrodes. For reference, the general power equations for a Faraday segmented MHD generator are as follows:

$$\text{Power} = \vec{E} \times \vec{J}$$

$$\vec{J} = \vec{J}_x + \vec{J}_y + \vec{J}_z,\ \vec{J}_x = 0,\ \vec{J}_y = 0$$

$$J_y = \sigma_0 \cdot U \cdot B \cdot (1-K)$$

$$\vec{E} = \vec{E}_x + \vec{E}_y + \vec{E}_z,\ E_z = 0$$

$$E_x = -\beta \cdot U \cdot B \cdot (1-K)$$

$$E_y = U \cdot B \cdot (1-K)$$

Where
  E=Electric field in x, y and z direction
  J=Faraday current in x, y and z direction
  $\beta$=How many electrons move before next collision
  K=Load factor (difference between closed and open circuit voltage)
  U=Fluid velocity
  B=Magnetic flux density
  $\sigma_0$=Conductivity
Such that $$\text{Power} = K \cdot U^2 \cdot B^2 \cdot \sigma_0 \cdot (1-K)$$

To further illustrate this equation, an example calculation is as follows. Assuming, for example, a flow channel being 3" (76.2 mm) with 5 electrode pair segments in the flow direction. There is a magnetic field (B) perpendicular to the electrodes (E field) and electrode cross section is approximately 50 mm×10 mm. With the permanent magnet we should be able to produce 0.41 Tesla (Using NdFeB, grade N52 magnet with $Br_{max}$ of 14,800 Gauss (1.48 Tesla) and surface field at 4176 Gauss (0.41 T). If for this example, we assume 100% water cut, conductivity of 25 S/m, and a flow velocity of 2 m/s, the following calculation is done as follows:

1) Conductivity Through the Fluid Channel:

$$\sigma_0 = \sigma \frac{A}{l} = 25\left[\frac{S}{m}\right] \cdot \frac{0.050[m] \cdot 0.01[m]}{0.0762[m]} = 0.164[S]$$

Where σ is the specific conductance per unit volume of a homogenous material. Solving the power equation by assuming the load factor K to be 0.5:

$$\text{Power} = K \cdot U^2 \cdot B^2 \cdot \sigma_0 \cdot (1-K) =$$
$$0.5 \cdot 2\left[\frac{m}{s}\right]^2 \cdot 0.41[T]^2 \cdot 0.164[S] \cdot (1-0.5) = 0.028[W] = 28 \text{ mW}$$

Thus, for multiple sets of electrode pairs, more energy may be generated. If we have for instance 1 electrode pair with 5 electrodes we should be able to generate 0.14 W power. Additional factors that may influence and vary the power output can include magnet strength, magnet size, electrode size, magnet shape, electrode surface area, flowrate, cross sectional area, and conductivity.

FIG. 1 shows the MHD principle in use in a general pipeline system according to an embodiment of the invention. The MHD power storage and generation system 100 includes electrodes 102 and magnets 104. In this embodiment, magnets 104 are on the outside of the pipeline while the electrodes 102 are inside the pipeline 108 and in direct contact with the multiphase flow 106 through the pipeline. In other embodiments, the electrodes 102 can be configured in the structure of the pipeline 108 itself or outside of the pipeline 108 if the pipeline 108 material is conducted. Such a configuration may be desirable to avoid corrosion of the electrodes 102. The multiphase fluid flow 106 goes from left to right through the pipeline 108. As the multiphase flow 106 goes through the harvesting system, a current is generated which is used to create energy inside a battery connected to the electrodes 102. The purpose of the energy harvesting device is to generate power to control a valve in an inflow control valve ("ICV") installed downhole or at a remote location with no access to other means of power. The valve may require power when there is water breakthrough in a well bore and an operator wants to operate the valve. This can occur if there is water breakthrough because it might be desirable to shut down or limit the amount of water from the water producing zone. The function of the downhole valve is to choke the water-producing interval when observed in order to regain hydrocarbon production. Before the water break-through occurs the valve will not require much power to operate. The more water flowing through the harvesting area 110, which contains a pair of electrode sets 102, the more energy is generated and stored. This power will then be used to power a valve for instance to choke the zone of interest in order to increase pressure and hence reduce the water flow.

Water Holdup Determining Using the MHD Principle Downhole

The same device that is used for power generation can be used for water holdup measurement. The amount of power generated is directly related to the amount of water in the system. This linear relationship can be used by the system to determine the water cut and water holdup measurement. Further, in an optimized embodiment of such a device, the contact area between the water and the electrodes, as well as the strength, size, and positioning of the magnets can be optimized. The design includes flow tubes that are used to capture the least resistive path for the electrodes and magnetic flux lines to flow to.

Figure 2:
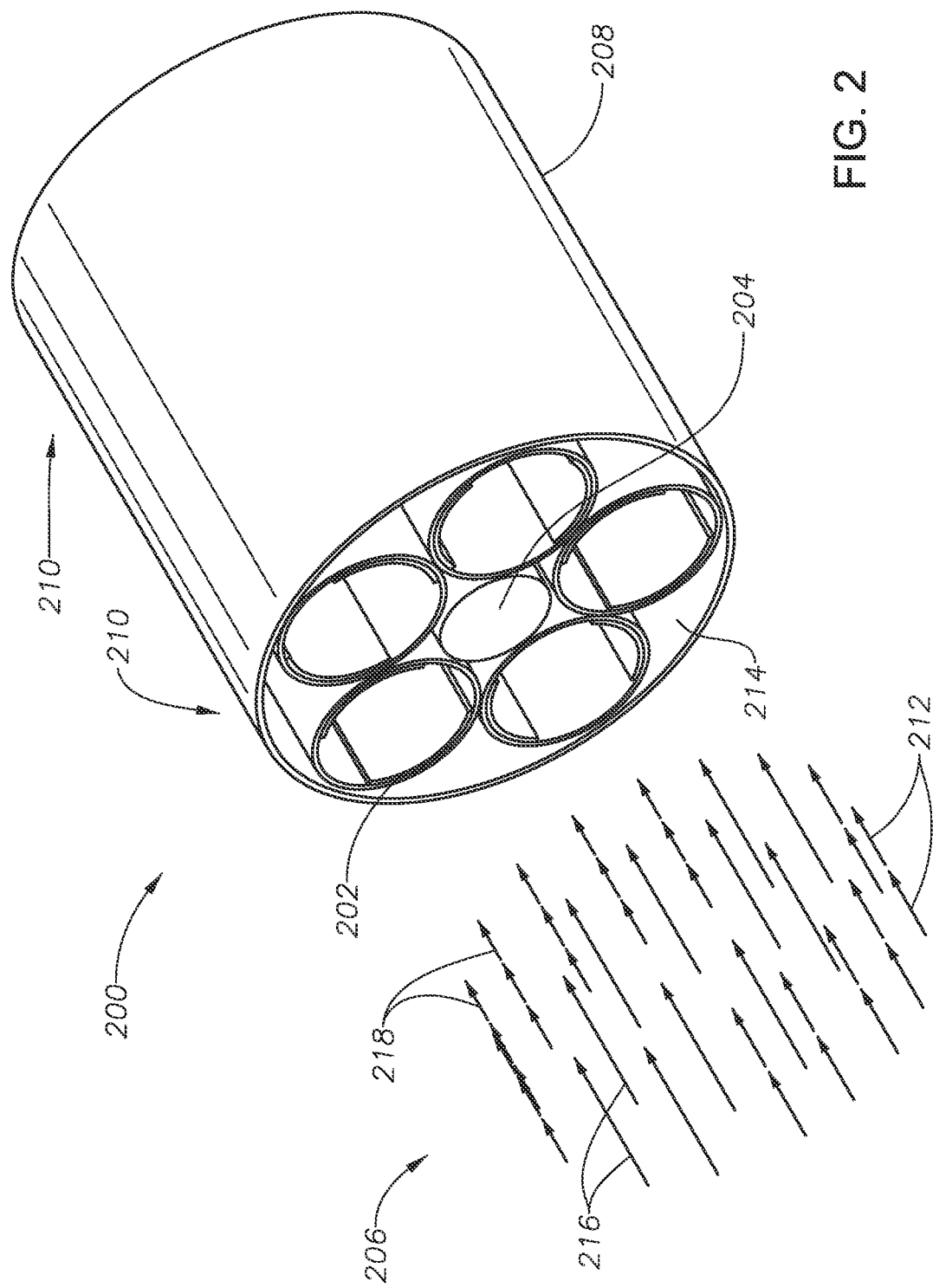
FIG. 2 illustrates a side perspective view of a general pipeline system configured in accordance with an embodiment wherein a magnet is configured in the central section of a pipeline.

The flow tube design in FIG. 2 illustrates another embodiment. This configuration is highly efficient when water is the heaviest component in the flowing media. This is because, in general, a higher concentration of water is flowing through the lower parts in such a configuration. Correspondingly, the higher tubes, will most likely experience more oil, and hence produce less electricity. The flow tubes use the density variations in the media to optimize the chance of capturing the continuous phase of conductive fluid best. Depending on the Reynolds number of the media, usually water flows in the low end of a horizontally placed pipe and gas is at the high end. The MHD system 200 in FIG. 2 forces the higher density conductive phase 212 into the lower section 214 of the pipe 208 so the flow rate will increase and increase the contact area for the power generation of the entire flowing media 206 through the whole pipe section 210 that is outfitted with the MHD system 200. The water 212 flows lower than the Oil 216 and gas 218. The electrodes 202 surround a magnet 204 through the whole system 200. The magnet 204 has flux lines perpendicular to the flow direction and the electric field in order to generate power. In this example, the total power generated by the system 202 and transferred for storage is given by the following equation: $TP=5*I^2*R1=(U^2*R1)/(R1+R2)^2$ where the internal resistance R1 depends on the conductivity of the fluid.

Figure 3:
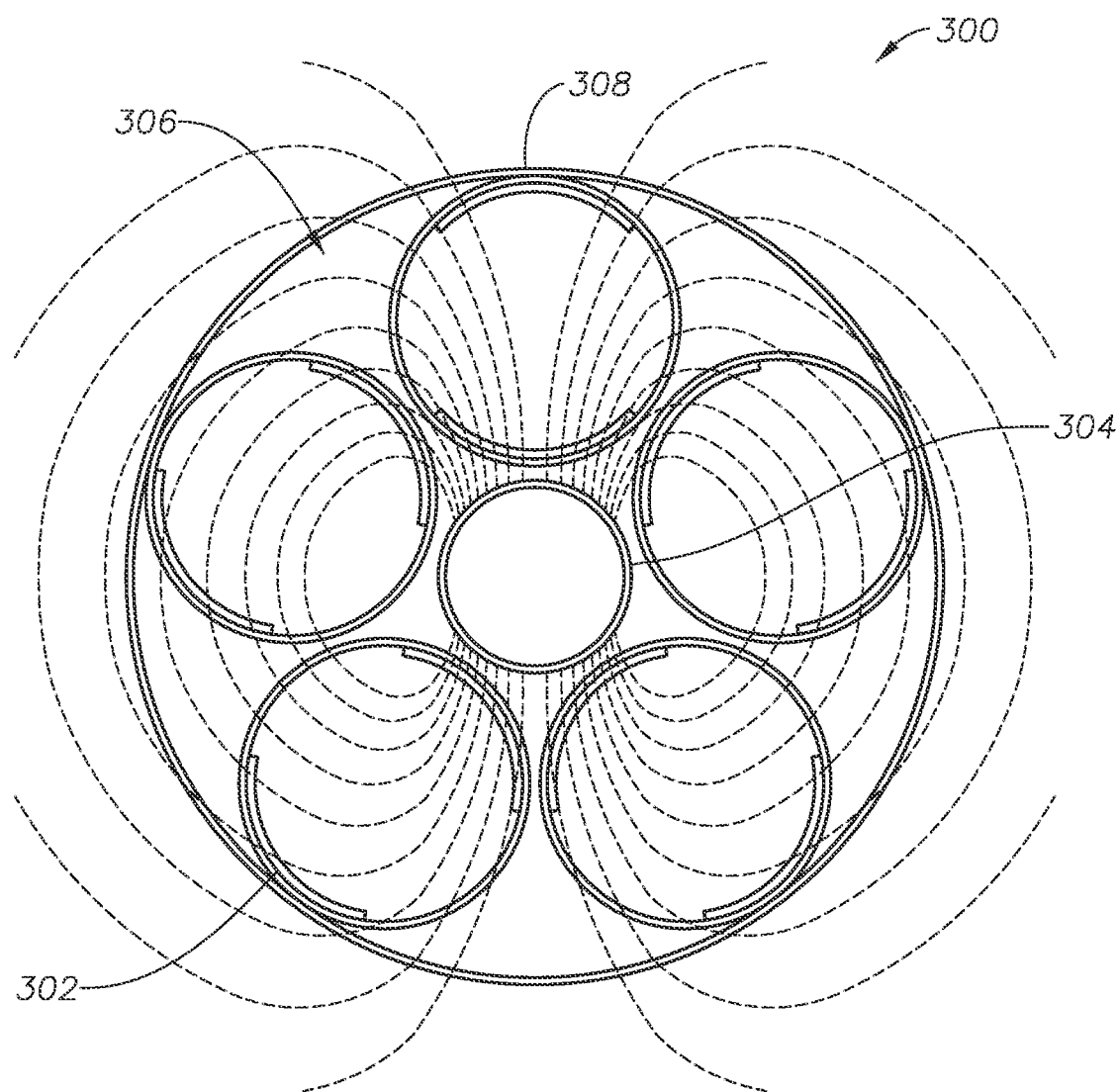
FIG. 3 illustrates a cross sectional view of a general pipeline system configured in accordance to an embodiment wherein a magnet is configured in the central section of a pipeline as similarly shown with respect to FIG. 2.

FIG. 3 shows the cross sectional view of the flux lines in the MHD system 300 according to another embodiment of. A permanent magnet suitable for the downhole environment can be used in the center of the pipe 308. Pairs of electrodes 302 are arranged outside the magnet 304 and create flux lines 306 coming from the magnet 304. In an embodiment, the power is generated most optimally if the electrodes 302 are configured to be perpendicular to the magnetic field. This setup will also have the effect of creating a pressure drop in the system increasing the kinetic energy and the power generation will also increase. If the velocity of the liquid is known, then the amount of power generated will be directly related to the conductive fluid flow. The system 300 can be used at the surface for power generation for any device connected to the pipeline and so the system 300 will not need alternate power sources.

The singular forms "a," "an," and "the" include plural referents, unless the context clearly dictates otherwise.

The foregoing disclosure and description of the disclosure is illustrative and explanatory of the embodiments of the disclosure. Various changes in the details of the illustrated embodiments can be made within the scope of the appended claims without departing from the true spirit of the disclosure. The embodiments of the present disclosure should only be limited by the following claims and their legal equivalents.

The invention claimed is:

1. A magnetohydrodynamic power generation system comprising:
    a permanent magnet coupled with a pipeline;
    elongate electrodes mounted lengthwise within the pipeline at spaced apart locations, the locations being in a path of a fluid that selectively flows through the pipeline, and the locations being intersected by a magnetic field generated by the magnet, so that when the fluid flows through the pipeline and across the electrodes, an electrical current is generated between the electrodes; and a downhole valve in electrical communication with the electrodes and that selectively receives the electrical current.

2. The magnetohydrodynamic power generation system of claim 1, wherein the permanent magnet is mounted on an outer surface of the pipeline and comprises a first permanent magnet, the system comprising a second permanent magnet that is mounted onto the outer surface of the pipeline on a side opposite the first permanent magnet, and wherein the electrodes comprise a pair of electrodes that are mounted opposite one another along an inner surface of the pipeline and orthogonal to the first and second permanent magnets.

3. The magnetohydrodynamic power generation system of claim 1, further comprising elongate flow tubes disposed lengthwise within the pipeline and wherein the permanent magnet is elongate and cylindrical and disposed in a middle portion of the pipeline and surrounded by the flow tubes, and wherein a pair of electrodes is mounted within inner sidewalls of each of the flow tubes and spaced opposite from one another.

4. The magnetohydrodynamic power generation system of claim 1, further comprising a processor in communication with the electrodes and the valves, the processor the processor executing a set of instructions on a non-transitory computer readable media to calculate a water holdup measurement based upon an amount of power generated by the magnetohydrodynamic power generation system.

5. The magnetohydrodynamic power generation system of claim 1, wherein the electrodes are mounted on inner sidewalls of the pipeline and contoured complementary to an inner surface of the pipeline.

\* \* \* \* \*